United States Patent [19]

Ibrahim et al.

[11] Patent Number: 5,272,191

[45] Date of Patent: Dec. 21, 1993

[54] COLD WATER SOLUBLE FILMS AND FILM FORMING COMPOSITIONS

[75] Inventors: Nagui I. Ibrahim, East Windsor, N.J.; Richard M. Herbert, Langhorne, Pa.

[73] Assignee: FMC Corporation, Philadelphia, Pa.

[21] Appl. No.: 748,139

[22] Filed: Aug. 21, 1991

[51] Int. Cl.$^5$ .................................................. C08L 1/00
[52] U.S. Cl. ..................................... 524/35; 524/43; 524/44; 524/45; 525/54.23
[58] Field of Search ................... 524/35, 43, 44, 45; 525/54.23

[56] References Cited

U.S. PATENT DOCUMENTS

| | | | |
|---|---|---|---|
| 2,524,008 | 9/1950 | Deney | 524/45 |
| 2,764,568 | 9/1956 | Hawkins | 524/45 |
| 3,113,674 | 12/1963 | Kiefer et al. | 206/84 |
| 3,132,693 | 5/1964 | Weisend | 524/44 |
| 3,277,009 | 10/1966 | Freifeld et al. | 252/90 |
| 3,631,135 | 12/1971 | McGuire | 524/45 |
| 3,634,260 | 1/1972 | Pickin | 252/95 |
| 4,200,557 | 4/1980 | Chatterjee et al. | 525/54.23 |
| 4,289,815 | 9/1981 | Lee | 428/35 |
| 4,522,738 | 6/1985 | Magid et al. | 252/90 |
| 4,532,063 | 7/1985 | Gueldenzopf | 252/90 |
| 4,747,976 | 5/1988 | Yang | 252/90 |
| 4,801,636 | 1/1989 | Smith et al. | 524/236 |
| 4,806,261 | 2/1989 | Ciallella et al. | 252/90 |

FOREIGN PATENT DOCUMENTS

| | | | |
|---|---|---|---|
| 0180287 | 5/1986 | European Pat. Off. | 524/44 |
| 2900110 | 7/1980 | Fed. Rep. of Germany | 524/45 |

OTHER PUBLICATIONS

FMC Product Sheet for Ac-Di-Sol modified cellulose gum; Bulletin SD-14, 1986.

*Primary Examiner*—Paul R. Michl
*Assistant Examiner*—LaVonda DeWitt
*Attorney, Agent, or Firm*—Robert D. Jackson; Patrick C. Baker

[57] ABSTRACT

The rate of disintegration in cold water of water soluble packaging films is improved by incorporating into a film forming polymer composition, to form a dry blend or aqueous dispersion, a substantially water insoluble cellulose material prepared from alkali metal salts of carboxy(lower alkyl) cellulose or hydroxy(lower alkyl) cellulose. The increased disintegration is achieved without loss of film stability and, in some cases, the film stability is improved.

21 Claims, No Drawings

COLD WATER SOLUBLE FILMS AND FILM FORMING COMPOSITIONS

FIELD OF THE INVENTION

This invention relates to compositions useful for preparing films which are rapidly solubilized in cold as well as ambient or warm water, and to the resulting films.

BACKGROUND OF THE INVENTION

Water soluble films are commonly used for the temporary protection of various materials, articles and surfaces. A typical application is the enclosure or packaging of active agents, such as water soluble or water dispersible solid materials, for preservation until it is desired to add the agents to an aqueous medium. The active agents may be substances which are toxic or harmful if directly contacted by a handler or may be materials which merely are difficult to dispense in accurate amounts in bulk.

Typical of active agents packaged in this manner are household cleaning products such as soaps, detergents, dyes and bleaches; agricultural chemicals such as fertilizers, herbicides and fungicides, and pesticides such as insecticides and nematicides; industrial process chemicals such as carbo black, activated charcoal, biocides, and other functional compounds; pharmaceuticals including solids and liquids; and generally any agents requiring protection prior to being added to an aqueous medium.

Other applications include the covering or "shrink-wrapping" of articles with water soluble film for protection during display, storage or shipment, such as vehicles and recreational products used in water (boats, jet skis, and the like), food products, and other consumer products, materials and surfaces where it is convenient to remove a protective film by soaking in or spraying with water.

Representative of U.S. patents on water soluble films, film forming polymer compositions and packaging, and other applications of the films are the following:

U.S. Pat. No. 3,113,674, Kiefer et al., describes a water soluble, heat sealable, film forming polymer composition, for the packaging of detergents, bleaches, dyes and other products, comprising a mixture of a cellulose acetate sulfate and either a polyvinyl alcohol (PVA) or a polyethylene glycol.

U.S. Pat. No. 3,277,009, Freifeld et al., describes water soluble packages for detergents in which the water soluble packaging material is a polyvinylpyrrolidone (PVP) derivative.

U.S. Pat. No. 3,634,260, Pickin, describes packaging materials for bleach compositions based on PVA containing 12-40% of unhydrolyzed polyvinyl acetate.

U.S. Pat. No. 4,289,815, Lee, describes sealed pouches for release of chlorinating agents in which the pouch material is a cold water insoluble PVA film.

U.S. Pat. No. 4,522,738, Magid et al., describes a double envelope toilet bowl cleaner packet, each envelope said to be formed of a cold water soluble polymer such as PVA or a carboxymethyl cellulose. The envelopes separate an acidic cleansing agent and a basic neutralizer. Testing was at 70° F.

U.S. Pat. No. 4,532,063, Gueldenzopf, describes a dissolvable bleach sheet is which the film forming polymer is a hydroxypropyl cellulose polymer.

U.S. Pat. No. 4,747,976, Yang et al., described packaging films for detergents in which the films are formed from copolymers of 90-100% hydrolyzed vinyl alcohol and a nonhydrolyzable comonomer such as an acrylate. The films are said to be stable over a wide range of temperature and humidity. Solubility was tested at 70° F.

U.S. Pat. No. 4,801,636, Smith et al., describes polymer films prepared from blends of PVA, a crosslinking agent for the PVA (such as boric acid), and an alkyl cellulose or derivative.

U.S. Pat. No. 4,806,261, Ciallella et al., describes packaging films for detergents comprising laminates of PVA and a water soluble cellulose compound such as carboxymethyl cellulose (CMC), sodium salt, combined with cellulose fibers.

A major problem encountered in packaging or protecting with water soluble films is poor disintegration of the films when contacted with cold water (about 70° C. or less). Poor disintegration is evidenced by failure to begin dissolving within a predetermined period (about 120 seconds or less), failure to dissolve at a sufficient rate, failure to dissolve cleanly (absence of lumps or stringy residue), or any combination thereof. In addition, improved cold water disintegration should be achievable without substantial loss of stability of the films over a wide range of storage and use conditions.

This problem is recognized in the following U.S. patents:

U.S. Pat. No. 3,695,989, Albert, achieves cold water solubility of PVA films at 40° F. by incorporating gas bubbles in the films.

U.S. Pat. No. 3,892,905, Albert, describes polymer mixtures of PVA, PVP and a plasticizer as a means for improving cold water solubility of polymer films.

U.S. Pat. No. 4,481,326, Sonenstein, cites the foregoing Albert patents and describes a more specific combination of PVA and PVP as a means of not only improving cold water solubility but also resistance of the films to aging under various conditions of temperature and humidity.

SUMMARY OF THE INVENTION

It has now been found that by introducing a substantially water insoluble cellulose material into a water soluble film forming composition, the cold water solubility of the resulting film can be substantially improved without loss of film stability. The films remain transparent, non-tacky, flexible, strong and handleable, and retain high rates of dissolution (disintegration) in cold as well as warm water, even after being stored at high temperatures. Moreover, by appropriate selection of polymer, the films may be heat-sealable and biodegradable. The invention thus extends in an economical and efficient manner the applications of water soluble films to the packaging or protection of materials and articles in circumstances in which it is desired to remove the films by contact with cold water.

DETAILED DESCRIPTION

Any water soluble, film forming polymer, or mixtures of polymers, may be used in the compositions of the present invention. The polymers usually are vinyl polymers, including homopolymers and copolymers, having functionality rendering the polymers water soluble, such as hydroxyl and carboxy groups. Typical water soluble polymers include at least one of polyvinyl alcohol, partially hydrolyzed polyvinyl acetate, polyvinyl pyrrolidone, alkyl celluloses such as methylcellulose, ethylcellulose, propylcellulose and derivatives thereof, such as the ethers and esters of alkyl celluloses, and acrylic polymers such as water soluble polyacrylates, polyacrylamides, and acrylic maleic anhydride copolymers. Suitable water soluble polymers further include copolymers of hydrolyzed vinyl alcohol and a nonhydrolyzable anionic comonomer, such as described in U.S. Pat. No. 4,747,966 to Yang et al, cited above.

It will be evident that a wide variety of film forming water soluble polymers can be used as packaging and protective films, including synthetic and natural polymers, and mixtures thereof, as described in standard textbooks on the subject and the patent literature. For example, in addition to the U.S. patents cited above, Japanese unexamined patent applications J01317506a published Dec. 22, 1989, and J60061504a published Apr. 9, 1985, describe water soluble films of PVA, PVP, methylcellulose, cellulose acetate, polyethylene oxide, gelatin, partially saponified PVA, CMC, dextrin, starch, hydroxyethyl cellulose, agar, pectin, and others for the packaging of process chemicals such as sodium sulfate and solid agricultural chemicals. Similarly, British patent 2191379 granted Dec. 16, 1987, describes the packaging of animal feed supplements in a plastic film of PVA, polyvinyl acetate, ethylene/vinyl acetate copolymer or an alkylcellulose ester. The disclosures of all of the above cited patents and patent applications are incorporated herein by reference.

Particularly preferred film forming polymers are PVA, vinyl alcohol/vinyl acetate copolymers, PVP, gelatin, and mixtures of any of the foregoing.

The film forming polymer may be further modified with various reagents commonly employed in the art such as plasticizers, surfactants, antifoamers, defoamers, biocides, and the like. Suitable plasticizers include glycerol, polyethylene glycol, trimethylolpropane, polyglycerols, alkane diols such as diethylene glycol, triethylene glycol, tetra(ethyleneglycol) and 1,3-butanediol; alkanolamines such as triethanolamine; alkanolamine acetates such as triethanolamine acetate; and alkanolacetamides such as ethanol acetamide. The plasticizers may be used in amounts conventionally employed in the film forming art to provide sufficient plasticization, for example, about 20–40% on weight of film forming polymer.

Representative of surfactants conventionally employed in the production of water soluble films include water soluble anionic surfactants such as carboxylate soaps, alkylarylsulfonates, alkanesulfonates, alpha-olefinsulfonates, fatty alcohol sulfates, and oxo-alcohol ether sulfates described in the technical literature including U.S. Pat. No. 3,634,260 cited above and others. A preferred anionic surfactant class comprises alkali metal salts of sulphated fatty alcohols containing about 10–18 carbon atoms, such as sodium lauryl sulfate and sodium stearyl sulfate. Suitable nonionic surfactants include the alkylphenol ethoxylates, fatty or oxo-alcohol polyethylene glycol ethers, ethylene oxide-propylene oxide block copolymers, and fatty alcohol polygylcol ethers. To a lesser extent amphoteric or cationic surfactants may also be employed in the film forming compositions of the invention, such as the alkyl betaines (sulfonated or nonsulfonated), quarternary ammonium salts and amine oxides. The surfactants may be used in amounts normally effective to assist in dispersion of water soluble polymers, such as about 1–30% by weight of total film forming composition.

Antifoam agents include the silicon polymers and defoamers include tallow compounds. Useful biocides comprise any of the many known materials having efficacy against bacteria and other degrading organisms but which are non-toxic to handlers and to mammals or persons in the environment of use. Such agents and the principles of selection are well known to those skilled in the art. Suitable biocides include quarternary ammonium salts such as alkyl($C_8$–$C_{18}$)di(lower alkyl)benzylammonium chloride and dialkyldimethylammonium bromide.

Component (b) is a substantially water insoluble cellulose material (abbreviated "CM" below) prepared from a cellulose starting material selected from alkali metal salts of carboxy(lower alkyl) cellulose and hydroxy(lower alkyl) cellulose. "Lower alkyl" includes about 1–6 carbon atoms, of which methyl and ethyl are preferred. Typical of such starting materials are alkali metal salts of carboxymethyl cellulose (CMC), hydroxypropyl cellulose, hydroxybutyl methyl cellulose, and hydroxypropyl methyl cellulose. The cellulose starting material is rendered substantially water insoluble by any of various processes known in the art including internal crosslinking by heat-curing of sodium CMC (U.S. Pat. No. 3,379,720—Reid), by providing excess acid groups sufficient to condense to form ester linkages, by reacting a carboxy(lower alkyl) cellulose with excess monochloroacetic acid and neutralizing (U.S. Pat. No. 3,678,031 to Schoggen), and by various other methods generally classified as external crosslinking processes represented by the carbon dioxide process of U.S. Pat. No. 4,200,736 to Shinobara et al. and the hydrogen chloride gas treatment process of U.S. Pat. No. Re 31,323 to Marder et al. (reissue of U.S. Pat. No. 4,200,737). Suitable reagents for external crosslinking include acetic anhydride, boric acid, formic anhydride, acetic formic anhydride, dicyclohexyl carbodiimide, acetone, methylethyl ketone, formaldehyde, and polyvalent metal ions such as calcium, magnesium and aluminum.

Various other crosslinking processes are summarized in the aforegoing patents, as in U.S. Pat. Nos. 4,200,736 and 3,678,031.

For economy and good control of product quality, the internally crosslinked alkali metal CMC products are preferred, particularly the heat-crosslinked products of U.S. Pat. No. 3,379,720. The water insoluble alkali metal CMC preferably will have a D.S. (degree of substitution, i.e., average number of hydroxyl groups substituted in the cellulose molecule per anhydroqluoose unit) in the ranqe of about 0.4–1.5, preferably about 0.6–1.2. For ease of manufacture, the sodium salt of CMC is the preferred form, but other alkali metal salts are also useful, such as the potassium salt.

The most preferred CM for use in the present invention is a commercially available material listed in the National Formulary as "croscarmellose sodium" (also known in the trade as modified "cellulose gum"), Types A and B. Type A contains 1–10% by weight water soluble material whereas Type B contains 12–30% by weight water soluble material. Type A is commercially available from FMC Corporation under the registered trademark Ac-Di-Sol. This material has a D.S. between 0.6 and 0.85 calculated on a dry weight basis. Type B is also useful but to a lesser extent. The CM disintegrant may be used alone or in combination with one or more other natural or synthetic, organic or inorganic, polymeric or non-polymeric materials having water absorbing and other properties which render the polymers useful as auxiliary disintegrants. Such auxiliary disintegrants include starches (corn and potato), amylose, lactose and other sugars, alginic acid, hydrated aluminum silicate, modified starches such as sodium starch glycolates and other etherified or esterified depolymerized starches, crosslinked polyvinylpyrrolidones, soy polysaccharides, and certain acrylic polymers such as crosslinked polyacrylic acid and polyacrylates.

The CM disintegrant is blended with and uniformly dispersed throughout the film forming polymer in any suitable amount to improve the rate of disintegration of the water soluble polymer film upon contact with water. It will be understood that useful amounts of CM may be determined in a routine manner depending upon the film forming polymer and other optional components of the finished composition such as plasticizer, surfactants and other additives. The CM disintegrant may be combined in dry form with dry film forming polymer and other ingredients, also in dry or semi-dry form, to produce a dry particulate composition. The CM disintegrant may also be added at any point in the preparation of aqueous solutions of the film forming polymer, along with other additives, to form an aqueous solution.

Generally, when PVA is the film forming polymer, the CM disintegrant may be blended with the PVA in the range of about 0.5-30% by weight based on the weight of the PVA. A preferred range is about 4-20%, most preferably 7.5-15% by weight based on PVA. Understandably, the amount of CM disintegrant to be added will depend upon the type of CM, film forming polymer and other ingredients in the formulation, particularly plasticizer and surfactant, and therefore may be adjusted accordingly.

In a preferred method of preparation (based on crosslinked alkali metal CMC as a representative CM disintegrant), an aqueous solution or dispersion of the film forming polymer and other additives (plasticizers, surfactant, biocide, auxiliary disintegrant, antifoaming agent, defoaming agent, etc.) is formed. To this mixture is then added a hydrated form of the CMC disintegrant. Prehydration of the CMC is preferred in order to promote dispersion in the polymer film forming solution and is accomplished by first adding the CMC to water, preferably incrementally, while stirring the mixture. It is also preferred that the CMC, prior to dispersion to form an aqueous slurry or addition to the film forming solution, be in the form of fine particles, preferably in the range of about 10 –40 microns, preferably about 15-25 microns. This is achieved by milling the CMC, as desired, using conventional dry-milling, wet-milling or homogenization techniques. Clarity of the resulting polymer film is enhanced by the small particle size CMC.

Polymer films are cast from the film solution or mixture by standard techniques, for example, by pouring or laying down the mixture on a smooth casting surface such as steel, aluminum or compatible plastic. The desired film thickness is obtained by using an adjustable micrometer film applicator, doctor blade, or like metering device. After application of the polymer solution, the aqueous medium is evaporated by any suitable means, as in an oven, to yield a transparent, uniformly thin film of the polymer blend, which film is then stripped from the casting surface for use.

When the film forming polymer, CM disintegrant and other additives are combined to form a dry, powdery blend, such blend may be dispersed in water to produce the film forming solution or mixture by agitation in the aqueous medium, using any suitable mixing means such as a homogenizer or Waring blendor. The film forming composition is then cast in the usual manner to form a water soluble film.

While not fully understood, it is believed that the water insoluble CM operates as a disintegrant in water soluble polymer films by absorbing water into the crosslinked regions of the CM, thereby exerting hydrostatic pressure on the closed packed polymers in the film, resulting in a quicker rupture of the film than would be accomplished without the CM. This effect is not significantly changed by aging of the film or other interaction which may take place between the film forming polymer and a material or product packaged in the film. The rapid cold water disintegrating properties of the composition is accompanied by superior resistance of the films to high temperature aging, as evidenced by the fact that the films maintain their mechanical strength and do not become soft and tacky.

The following examples illustrate the invention but are not intended to limit the scope thereof. In the examples and throughout this specification all parts and percentages are by weight and all temperatures are ° C. unless otherwise indicated.

EXAMPLE 1

DISINTEGRATION OF NON-AGED PVA FILM

To a warm (60° C.), stirred solution of 11.7 g of poly(ethyleneglycol) (average molecular weight 400), 3.0 g of sodium lauryl sulfate. and 0.15 g of Germall-II ® germicide (Sutton Laboratories Inc.) in 210 mL of water was added portionwise 39.0 g of Airvol 205 ® polyvinyl alcohol (Air Products & Chemicals Inc.). Polyvinylpyrrolidone (crosslinked, 4.5 g), and corn starch (15.0 g) were then added to the mixture. Ac-Di-Sol ® internally crosslinked sodium carboxymethylcellulose (FMC Corporation, 4.5 g) was hydrated with 30 mL of water and added to the mixture. The resultant mixture Was stirred and heated at 60° C. until a smooth, homogenous blend was obtained. The mixture was allowed to cool to room temperature. Ten films were prepared from this mixture by pouring approximately 20 to 25 g of the mixture onto a nine inch by nine inch aluminum plate. This plate was placed in an adjustable micrometer film applicator with a six inch spreader blade. The mixture was spread across the aluminum plate, and the plate was placed in an oven (50° C.) for twenty-five minutes. The resulting film was removed, and the percent moisture was measured on an Ohaus moisture balance. The percent moisture for all films was 7-8%.

Each film was cut and folded into a 5.08 cm by 5.08 cm bag which was heat sealed. Each bag was tested independently by dropping it into a one quart glass jar containing approximately 550 mL of cold (7° C.) tapwater. The container was sealed and inverted three times. Simultaneously, a stop watch was started. The container was allowed to stand while the film was observed and the number of seconds recorded for film disintegration to begin. After two minutes the container was again inverted three times. The time needed for the film to fully disintegrate was recorded. The bags prepared in this example began to disintegrate within 120 seconds and were fully disintegrated within 240 seconds.

Five of the films prepared in this example were analyzed for stress and strain using an Instron Corporation Series IX Automated Materials Testing System.

The results of the analysis are set forth in Table 1 from which it will be seen that the strength (Stress data) and elongation (Strain data) of films of the invention, although less than that of the standard, were sufficient for most uses of the films such as protective coverings and bags for moderate loads.

TABLE 1

| Specimen Number | Stress at Maximum Load (psi) | % Strain at Maximum Load | Stress at Automatic Break (psi) | % Strain at Automatic Break |
|---|---|---|---|---|
| Average of 5 films | 1126.0 | 19.69 | 810.2 | 28.99 |
| STANDARD[a] | 2143.0 | 625.8 | 1821.0 | 659.2 |

[a] Bartlo Standard Film, average of five films.

EXAMPLE 2

DISINTEGRATION OF AGED PVA FILM

Four batches of ten PVA films each were prepared using the PVA and process described in Example 1 but having other ingredients and the amounts shown in Table 2-1.

TABLE 2

| Film Batch | Film Ingredients | | | | | Non-aged Film Disintegration Time |
|---|---|---|---|---|---|---|
| | PVA[a] | ADS[b] | Germicide[c] | PEG[d] | Water | Cold Water (70° C.)(Sec)[e] |
| 2A | 13.5 | 10.0 | 0.045 | 5.9 | 141.5 | 267 |
| 2B | 13.5 | | 0.045 | 5.9 | 151.5 | 438 |
| 2C | f | 3.0 | | | | 240 |
| 2D | f | | | | | 480 |

[a] Polyvinyl alcohol (Air Products & Chemicals, Inc.)
[b] Ac-Di-Sol ® Modified Cellulose Gum
[c] Germall-II ® Germicide
[d] Polyethylene glycol (molecular wt. 400) (PEG)
[e] Time from initial water contact until complete dissolution
[f] Commercially available PVA film solution from Polymer Film Corporation. Contains PVA and 15% by weight of a starch.

One film from each of the above batches was aged by storing on an open dish at 50° C. for two weeks.

Each film sample (4 cm×2 cm) was tested independently by immersing it into 550 mL of cold (7° C.) tapwater in a one quart glass jar. The jar was sealed and was inverted five times. Simultaneously, a stopwatch was started. This container was allowed to stand while the film was observed. At two minute intervals the container was inverted five times and then allowed to stand until each film disintegrated completely. The time required for each film to disintegrate is recorded in Table 2-1 (non-aged films) and Table 2—2 (aged films).

TABLE 2-2

| Film Batch | Time (Sec) Required for Aged Film Disintegration | |
|---|---|---|
| | Initial Disintegration | Complete Disintegration |
| 2A | 90 | <240 |
| 2B | >120 | <240 |
| 2C | >120 | <240 |
| 2D | 480 | 600 |

Aged films batches 2A, 2B, and 2C dispersed into cold water uniformly within four minutes, i.e., there were no stringy remnants or agglomerates. After ten minutes in cold water, aged film 2D had disintegrated leaving stringy pieces. It appears from a comparison of the results of Tables 2-1 and 2—2 that the presence of a germicide and plasticizer (PEG) prolongs disintegration time but aging offsets the effects of the additives since the complete disintegration times of CMC containing aged films are short and about the same.

EXAMPLE 3

DISINTEGRATION OF AGED WATER SOLUBLE BAGS CONTAINING AGRICULTURAL PESTICIDE

Into a Monosol 2000 ® water soluble polyvinyl alcohol (Chris-Craft Industrial Products Corp.) bag, containing no CMC disintegrant, was placed 7.5 g of a 50% active ingredient wettable powder formulation of cypermethrin. A second water soluble bag, prepared using the film forming composition and process of Example 2A, was also filled with 7.5 g of a 50% active ingredient wettable powder formulation of cypermethrin. Both bags were heat sealed and placed in separate foil lined paper packets. These packets were placed in a 50° C. oven for forty-two weeks. The packets were removed from the oven and were allowed to cool to room temperature. The packets were opened and the water soluble bags were removed. Each bag was placed on the surface of approximately four liters of ice water (no stirring), and the times for initial and complete disintegration were recorded and general observations were made.

For the water soluble bag made of Monosol 2000 film, initial disintegration was at 130 seconds and complete disintegration occurred at 555 seconds. The initial disintegration for the bag prepared as in Example 1 was 120 seconds and complete disintegration was complete after 210 seconds.

The contents of the Monosol 2000 film bag were wet very slowly, and when the bottom of the bag disintegrated, the insecticide mixture settled to the bottom of the container in several large chunks. The top of the bag remained on the surface of the water. Even after stirring the cold mixture with a spatula for approximately 15 seconds, clumps of the insecticide mixture and pieces of film were evident.

The contents of the bag prepared as in Example 1 were wet quickly, and as the bottom of the bag disintegrated, the insecticide mixture crumbled in small pieces which tended to disperse as they fell through the water. The top portion of the bag sank simultaneously with the last portion of the insecticide mixture. Stirring this cold mixture provided an evenly dispersed mixture with no evidence of remnants of the water soluble film.

The foregoing experiment demonstrates the effectiveness of the sodium CMC as a disintegrant of pesticide containing water soluble bags, even after storage at 50° C. for extended periods.

We claim:

1. A self-supporting packaging film comprising (a) at least one water soluble polymer, and (b), in an amount effective to improve disintegration of the film in cold water, a water insoluble cellulose material prepared from a cellulose starting material selected from alkali metal salts of a carboxy(lower alkyl) cellulose and hydroxy(lower alkyl) celluloses.

2. The film of claim 1 wherein water soluble polymer (a) is polyvinyl alcohol, polyvinyl pyrrolidone, a polyvinyl pyrrolidone derivative, hydrolyzed polyvinyl acetate, an alkyl cellulose, copolymers of hydrolyzed vinyl alcohol and a nonhydrolyzable anionic comonomer, or any mixtures of two or more of the foregoing.

3. The film of claim 1 wherein component (b) is a sodium salt.

4. The film of claim 1 wherein component (b) is an internally crosslinked alkali metal salt of carboxymethyl cellulose.

5. The film of claim 4 wherein the carboxymethyl cellulose salt is a sodium salt having a D.S. of about 0.4–1.5 and containing less than about 10 wt. % of water soluble material.

6. The film of claim 4 wherein the carboxymethyl cellulose salt is heat-crosslinked.

7. The film of claim 1 wherein the amount of component (b) is in the range of about 0.2 to 10 wt. % based on total film weight.

8. The film of claim 1 also containing one or more of a plasticizer, a surfactant, a biocide, an antifoamer, a defoamer, and an auxiliary disintegrant.

9. The film of claim 8 wherein the plasticizer is a polyalkylene glycol, glycerol, a polyglycerol, an alkane diol, an alkanolamine, an alkanolamine acetate, or an alkanol acetamide.

10. The film of claim 8 wherein the surfactant is anionic and the auxiliary disintegrant is starch, or an etherified or esterified depolymerized starch.

11. The film of claim 1 wherein water soluble polymer (a) is polyvinyl alcohol and component (b) is an internally crosslinked sodium salt of carboxymethyl cellulose having a D.S. of about 0.4–1.5 and containing less than about 10 wt. % of water soluble material.

12. The film of claim 11 also containing a plasticizer and a surfactant.

13. The film of claim 12 wherein the plasticizer is a polyalkylene glycol and the surfactant is a fatty alcohol sulfate.

14. A composition of matter comprising (a) a water soluble film forming polymer, and (b) a substantially water insoluble alkali metal salt of carboxymethyl cellulose in an amount effective to improve disintegration in cold water of a film produced from the polymer.

15. The composition of claim 14 in the form of an aqueous dispersion.

16. The composition of claim 14 in the form of a dry blend.

17. The composition of claim 14 in the form of an aqueous dispersion and also containing a plasticizer for the film forming polymer.

18. The composition of claim 14 in the form of a dry blend and also containing a plasticizer for the film forming polymer.

19. The composition of claim 17 or 18 wherein the plasticizer is a polyalkylene glycol.

20. The composition of claim 14 wherein component (b) is an internally crosslinked sodium salt of carboxymethyl cellulose having a D.S. of about 0.4–1.5 and containing less than about 10 wt. % of water soluble material.

21. A composition of matter comprising (a) a water soluble film forming polymer, and (b) a substantially water insoluble cellulose material prepared from a cellulose starting material selected from alkali metal salts of a carboxy(lower alkyl)cellulose and hydroxy(lower alkyl)celluloses, the amount of (b) being effective to improve disintegration in cold water of a film produced from the polymer.

* * * * *